US012615633B2

(12) United States Patent
Lin et al.

(10) Patent No.: US 12,615,633 B2
(45) Date of Patent: Apr. 28, 2026

(54) UPLINK SCHEDULING METHOD AND RELATED UPLINK SCHEDULER

(71) Applicant: Realtek Semiconductor Corp., HsinChu (TW)

(72) Inventors: Jhe-Yi Lin, HsinChu (TW); Hsien-Chun Huang, HsinChu (TW); Yun-Tai Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 86 days.

(21) Appl. No.: 18/632,328

(22) Filed: Apr. 11, 2024

(65) Prior Publication Data

US 2025/0024453 A1    Jan. 16, 2025

(30) Foreign Application Priority Data

Jul. 11, 2023    (TW) ................................. 112125868

(51) Int. Cl.
*H04W 72/1268*    (2023.01)
*H04L 5/00*    (2006.01)
*H04W 24/02*    (2009.01)
*H04W 80/02*    (2009.01)

(52) U.S. Cl.
CPC ....... *H04W 72/1268* (2013.01); *H04L 5/0053* (2013.01); *H04W 24/02* (2013.01); *H04W 80/02* (2013.01)

(58) Field of Classification Search
CPC . H04W 72/1268; H04W 24/02; H04W 80/02; H04L 5/0053
See application file for complete search history.

(56) References Cited

U.S. PATENT DOCUMENTS

| | | | | |
|---|---|---|---|---|
| 2008/0019312 | A1* | 1/2008 | Venkatachalam ... | H04W 72/569 370/330 |
| 2015/0078323 | A1* | 3/2015 | Song ..................... | H04W 28/18 370/329 |
| 2017/0347376 | A1* | 11/2017 | Sakai ................ | H04W 74/0808 |
| 2018/0110065 | A1* | 4/2018 | Lin ................... | H04W 72/1268 |
| 2018/0206213 | A1* | 7/2018 | Kim ....................... | H04L 69/22 |
| 2019/0297020 | A1 | 9/2019 | Mudireddy | |
| 2019/0347772 | A1* | 11/2019 | Zhang .................. | G01R 33/565 |
| 2022/0092438 | A1* | 3/2022 | Casey ................. | G06V 10/764 |
| 2023/0198644 | A1* | 6/2023 | Mody ................. | H04B 17/345 |
| 2024/0015581 | A1* | 1/2024 | Ciftcioglu ......... | H04W 28/0284 |

* cited by examiner

*Primary Examiner* — Noel R Beharry
*Assistant Examiner* — Phillip J Kearns
(74) *Attorney, Agent, or Firm* — Winston Hsu

(57) ABSTRACT

An uplink scheduling method, for a computer communication network includes determining a ratio of a quantity of transmission control protocol (TCP) pair data and a quantity of an acknowledgement (ACK) of the TCP according to information of a media access control (MAC) layer, system parameters of the MAC layer and transmission data of the computer communication network by a deep learning structure.

10 Claims, 4 Drawing Sheets

—50

502
Start

Determine the ratio of the TCP data and the quantity of the ACK of the TCP according to information of the MAC layer, the system parameters of the MAC layer and the transmission data of the computer communication network by the deep learning structure

504

506
End

20

UPLINK SCHEDULING METHOD AND RELATED UPLINK SCHEDULER

BACKGROUND OF THE INVENTION

1. Field of the Invention

The present invention relates to an uplink scheduling method and related uplink scheduler, to an uplink scheduling method and related uplink scheduler capable of avoiding congestion collapse.

2. Description of the Prior Art

The physical layer (PHY) layer of the computer communication network provides unreliable packet transmission. The packet may be dropped and loss due to channel collisions, the packet cannot arrive on time sequentially, the packet arrives after a long latency time period, or repeated packet transmission when the routing is dynamically changed by the packet switching system. The transmission control protocol (TCP) is a communication protocol, which provides reliable data transmission and TCP with acknowledgement (ACK) and retransmission technology.

However, the control mechanism of the conventional TCP determines whether or not to reduce the transmission rate according to the received TCP ACK. For example, when a transmitter does not receive the TCP ACK, the transmitter may determine that the network congestion happens and then reduce the transmission rate. In this situation, a quality of experience (QoE) is reduced.

Since the TCP ACK belongs to a short packet, the efficiency of the media access control (MAC) is reduced when the TCP ACK is transmitted when the receiver receives each piece of the TCP data. Assume that N is a ratio of a quantity of the TCP data and a quantity of the TCP ACK, e.g. when N=1, the transmitter immediately requests network interface card (NIC) for the TCP ACK when a piece of TCP data is transmitted; when N=2, the transmitter requests the NIC for the TCP ACK when two pieces of TCP data is transmitted.

FIG. 1 is a schematic diagram of a queue size of data versus a transmission control protocol pair. As shown in FIG. 1, the horizontal axis denotes the quantity of the TCP pair, the vertical axis denotes the data quantity buffered in the queue of the MAC layer. As can be known from FIG. 1, with the TCP pair increases, the queue size buffered in the queue of the MAC layer corresponding to N=1 is closed to a fixed value. When N=2, the queue size buffered in the queue of the MAC layer is exponentially increased, and causes congestion collapse.

Therefore, how to determine an optimal N value for different scenarios is an important issue to the conventional technique.

SUMMARY OF THE INVENTION

In light of this, the present invention provides an uplink scheduling method and related uplink scheduler to solve the above issues with generalization of artificial intelligence (AI).

An embodiment of the present invention discloses an uplink scheduling method, for a computer communication network comprises determining a ratio of a quantity of transmission control protocol (TCP) pair data and a quantity of an acknowledgement (ACK) of the TCP according to information of a media access control (MAC) layer, system parameters of the MAC layer and transmission data of the computer communication network by a deep learning structure.

Another embodiment of the present invention discloses an uplink scheduler, for a computer communication network, comprises a decision engine, configured to determine a ratio of a quantity of transmission control protocol (TCP) pair data and a quantity of an acknowledgement (ACK) of the TCP according to information of a media access control (MAC) layer, system parameters of the MAC layer and transmission data of the computer communication network by a deep learning structure; and a scheduler, coupled to the decision engine, and configured to request the ACK of the TCP of a receiver of the computer communication network according to the ratio.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
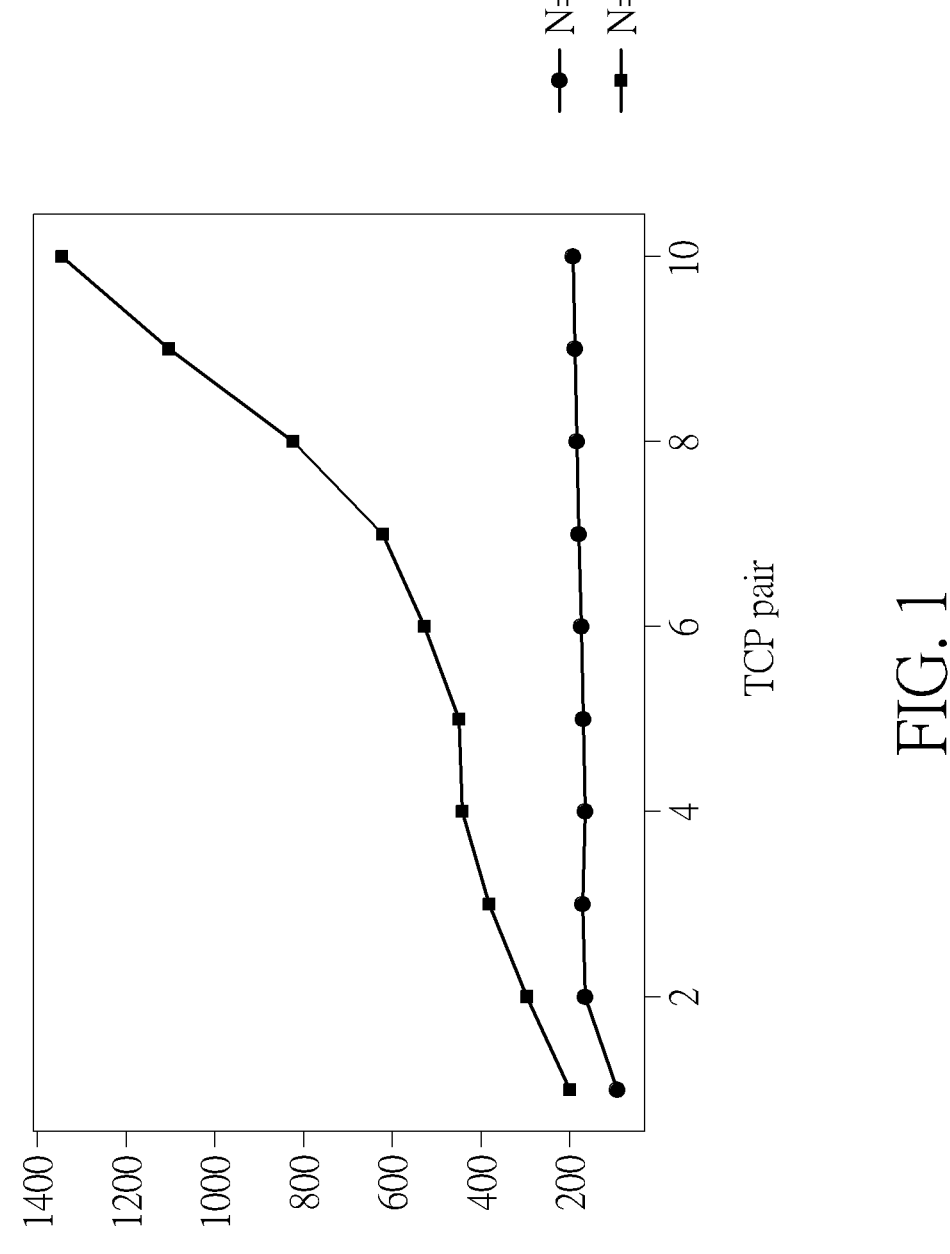
FIG. 1 is a schematic diagram of a queue size of data versus a transmission control protocol pair.
Figure 1:
Figure 2:
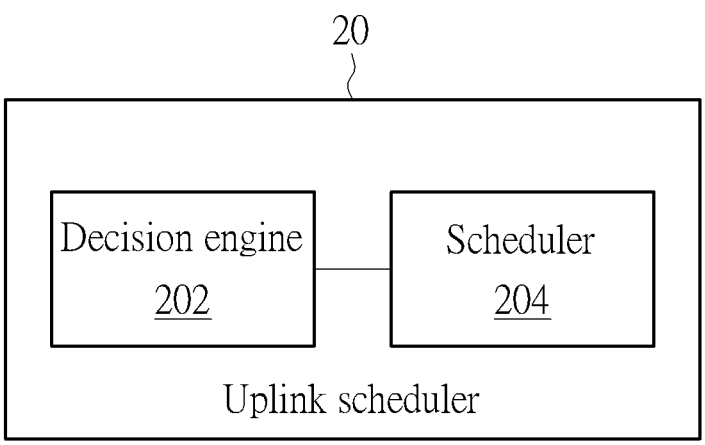
FIG. 2 is a schematic diagram of an uplink scheduler according to an embodiment of the present invention.

Please refer to FIG. 2, which is a schematic diagram of an uplink scheduler 20 according to an embodiment of the present invention. The uplink scheduler 20 is utilized for a computer communication network, the uplink scheduler 20 includes a decision engine 202 and a scheduler 204. The decision engine 202 is configured to determine a ratio of a quantity of transmission control protocol (TCP) pair data and a quantity of an acknowledgement (ACK) of the TCP according to information of a media access control (MAC) layer, system parameters of the MAC layer and transmission data of the computer communication network by a deep learning structure to maximize a quality of experience (QoE) of a computer communication system. The scheduler 204 is coupled to the decision engine 202, and is configured to request the ACK of the TCP of a receiver of the computer communication network according to the ratio of the TCP pair.

Figure 3:
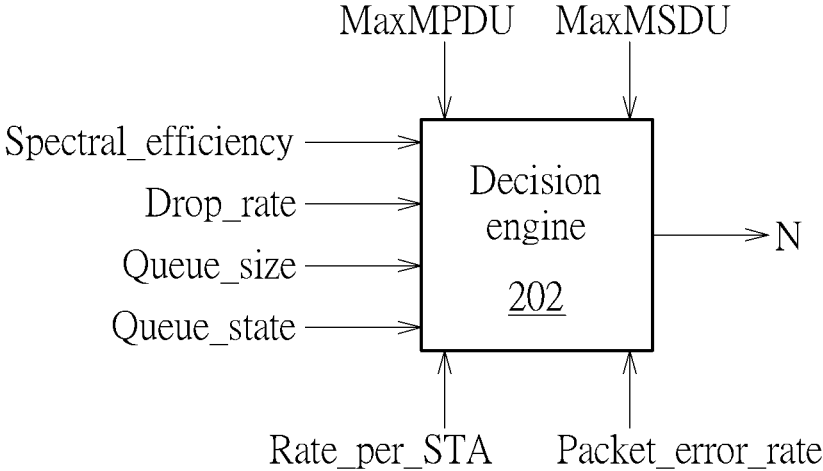
FIG. 3 is a schematic diagram of a decision engine according to an embodiment of the present invention.

Please refer to FIG. 3, which is a schematic diagram of the decision engine 202 according to an embodiment of the present invention. The decision engine 202 according to an embodiment of the present invention is configured to illustrate characteristics of the TCP layer according to the information of the MAC layer to predict a ratio N. For example, when N=1, a transmitter requests an ACK of the TCP once a piece of TCP data is transmitted; when N=2, the transmitter requests an ACK of the TCP when two pieces of TCP data is transmitted, and so forth.

As shown in FIG. 3, input parameters of the decision engine 202 may include a queue length Queue_size buffered in the transport layer of the computer communication network, a queue state Queue_state (e.g. empty queue state or full queue state), a packet drop rate Drop_rate, a maximum value of MAC Protocol Data Unit (MaxMPDU), a maximum value of MAC Service Data Unit (MaxMSDU) of the system parameters of the MAC layer and a spectrum utilization efficiency Spectral_efficiency, a station transmission rate Rate_per_STA and a packet error rate Packet error rate of the statistic transmission data after the transmission.

The decision engine 202 is configured to transform the above input parameters into a multi-class classification problem to determine the ratio based on the deep learning structure to determine the ratio N for optimizing the user experience of the computer communication system.

In order to avoid gradient exposure and identity mapping, the embodiment of the present invention learns the data characteristics based on a residual learning method. In an embodiment, a ResNet-50 structure may be utilized for learning the characteristics for the uplink scheduler 202 to determine an optimal ratio N for different scenarios. Therefore, the scheduler 204 may be utilized in different scenarios to request the ACK of the TCP of the receiver of the computer communication network according to the ratio N, which is determined by the decision engine 202 of the uplink scheduler 20 according to an embodiment of the present invention, such that the ACK of the TCP is triggered whenever N piece(s) of the TCP data is transmitted.

Figure 4:
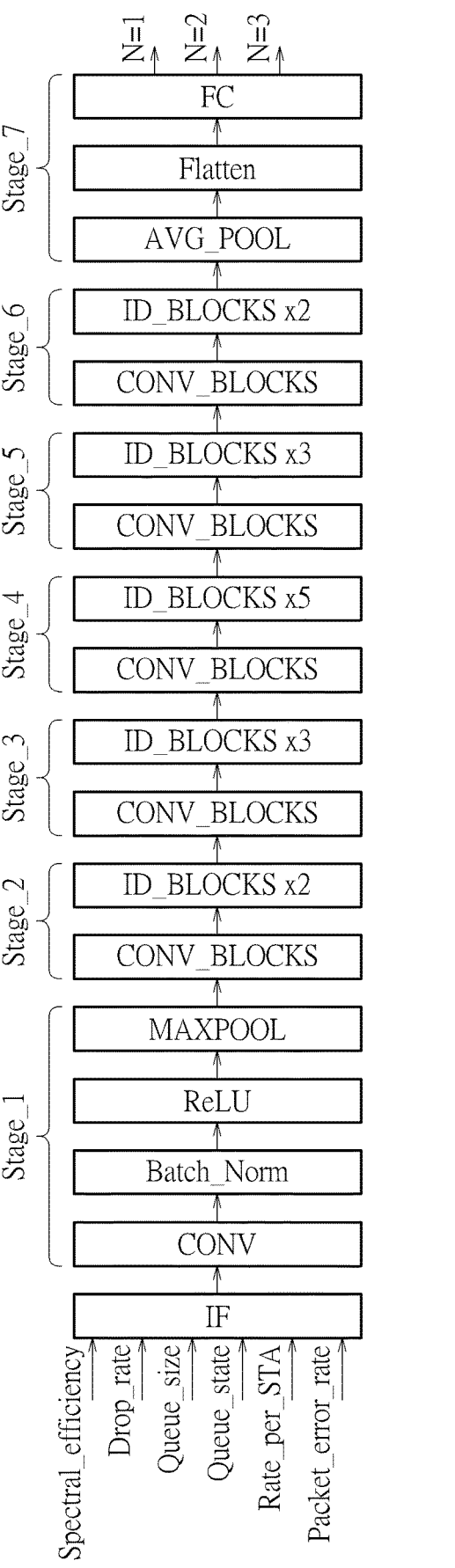
FIG. 4 is a schematic diagram of a structure of a ResNet-50 according to an embodiment of the present invention.
Figure 5:
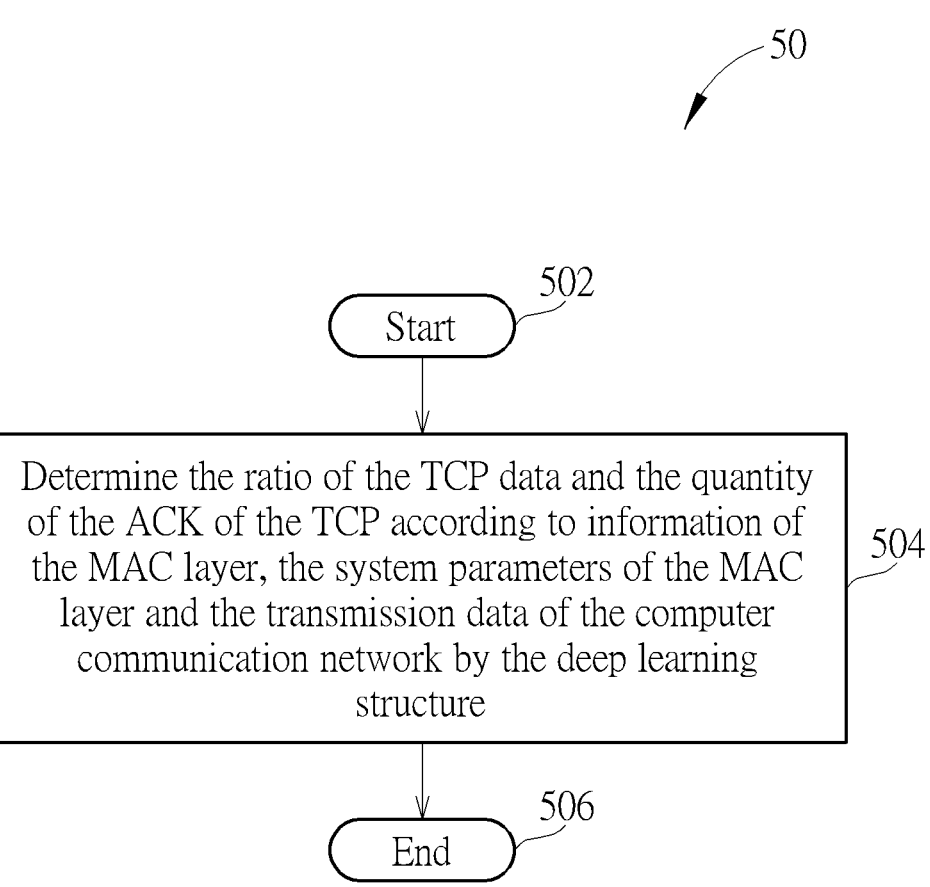
FIG. 5 is a schematic diagram of an uplink scheduling method according to an embodiment of the present invention.

Please refer to FIG. 4, which is a schematic diagram of a structure of a ResNet-50 according to an embodiment of the present invention. The ResNet-50 structure includes an input format module IF and stages Stage_1-Stage_7. The input format module IF is configured to format the input parameters and the formatted inputs are processed with a convolution module CONV, a batch normalization module Batch Norm, a rectified linear unit ReLU and a Max pooling module MAXPOOL.

The stages Stage_2-Stage 6 are configured to process the data output by the stage Stage_1 with convolution module CONV_BLOCKS and identity block modules ID_BLOCKS to converge errors for the learning network. The stage Stage_7 is configured to process the output data from the stage Stage_6 with an average pooling module AVG_POOL, a flatten module Flatten and a fully connected layer FC to determine the optimal ratio N.

An operation method of the uplink scheduler 20 can be summarized as an uplink scheduling method 50. The uplink scheduling method 50 includes the following steps:

Step 502: Start;

Step 504: Determine the ratio of the TCP data and the quantity of the ACK of the TCP according to information of the MAC layer, the system parameters of the MAC layer and the transmission data of the computer communication network by the deep learning structure;

Step 506: End.

Refer to the embodiments of the uplink scheduler 20 mentioned above for the operation process of the uplink scheduling method 50, which is not narrated herein for brevity.

Notably, the ResNet-50 structure, the input parameters for the decision engine of the above embodiments may all be modified according to requirements and all belong to the scope of the present invention.

In summary, the present invention provides an uplink scheduling method and related uplink scheduler, which determines a ratio of a quantity of transmission control protocol (TCP) pair data and a quantity of an acknowledgement (ACK) of the TCP according to different utilization scenarios by characteristics of a deep learning structure for the uplink scheduler to maximize a quality of experience (QoE) of a computer communication system Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An uplink scheduling method, for a computer communication network, comprising:

determining a ratio of a quantity of transport transmission control protocol (TCP) pair data and a quantity of an acknowledgement (ACK) of the TCP according to information of a media access control (MAC) layer, system parameters of the MAC layer and transmission data of the computer communication network by a deep learning structure; and requesting, by a scheduler, the ACK of the TCP from a receiver of the computer communication network according to the ratio;

wherein the ratio is determined based on the deep learning structure by a decision engine;

wherein the scheduler is coupled to the decision engine;

wherein the decision engine is configured to transform the information of the MAC layer, the system parameters of the MAC layer and transmission data of the computer communication network into a multi-class classification problem to determine the ratio.

2. The uplink scheduling method of claim 1, wherein the information of the MAC layer includes at least one of a queue length, a queue state, a packet drop rate buffered in a transport layer of the computer communication network.

3. The uplink scheduling method of claim 1, wherein the system parameters of the MAC layer include at least one of a maximum value of MAC Protocol Data Unit (MaxMPDU) and a maximum value of MAC Service Data Unit (MaxMSDU).

4. The uplink scheduling method of claim 1, wherein the transmission data includes at least one of a spectrum utilization efficiency, a station transmission rate and a packet error rate.

5. The uplink scheduling method of claim 1, wherein the deep learning structure is configured to learn data characteristics according to a residual learning method.

6. An uplink scheduler, for a computer communication network, comprising:

a decision engine, configured to determine a ratio of a quantity of transport transmission control protocol (TCP) pair data and a quantity of an acknowledgement (ACK) of the TCP according to information of a media access control (MAC) layer, system parameters of the MAC layer and transmission data of the computer communication network by a deep learning structure; and a scheduler, coupled to the decision engine, and configured to request the ACK of the TCP from a receiver of the computer communication network according to the ratio;

wherein the decision engine is configured to transform the information of the MAC layer, the system parameters of the MAC layer and transmission data of the computer communication network into a multi-class classification problem to determine the ratio.

7. The uplink scheduler of claim 6, wherein the information of the MAC layer includes at least one of a queue length, a queue state, a packet drop rate buffered in a transport layer of the computer communication network.

8. The uplink scheduler of claim 6, wherein the system parameters of the MAC layer include at least one of a maximum value of MAC Protocol Data Unit (MaxMPDU) and a maximum value of MAC Service Data Unit (MaxMSDU).

9. The uplink scheduler of claim 6, wherein the transmission data includes at least one of a spectrum utilization efficiency, a station transmission rate and a packet error rate.

10. The uplink scheduler of claim 6, wherein the deep learning structure is configured to learn data characteristics according to a residual learning method.

\*  \*  \*  \*  \*